United States Patent [19]
Richardson

[11] Patent Number: 5,473,234
[45] Date of Patent: Dec. 5, 1995

[54] LEVEL SENSOR AND CONTROL APPARATUS

[76] Inventor: Robert H. Richardson, Rte. #1, Box 12A, Hayesville, N.C. 28904

[21] Appl. No.: 174,679

[22] Filed: Dec. 28, 1993

[51] Int. Cl.$^6$ .................................................. B65G 43/08
[52] U.S. Cl. ............................................. 318/479; 318/482
[58] Field of Search ................................. 318/478, 479, 318/482, 646; 222/57 CH, 65, 66, 77

[56] References Cited

U.S. PATENT DOCUMENTS

| | | | |
|---|---|---|---|
| 4,202,438 | 5/1980 | Rotilio | 222/64 X |
| 4,210,895 | 7/1980 | Sado et al. | 338/99 |
| 4,527,714 | 7/1985 | Bowman | 222/56 |

Primary Examiner—Brian Sircus

[57] ABSTRACT

Force responsive sensors and circuitry which detect the present and absence of a meterial within a storage bin or hopper and activates a motor to maintain the level of the material within preset limits. The sealed sensors are state-of-the-art force sensing resistive types and the circuitry is all solid-state with no relays or other mechanical devices used. The ON/OFF condition of the motor is controlled by a triac switch whose gate is optically isolated from the control circuitry with the use of a zero-crossing turn on triac optical coupler. The low voltage and low power required to operate the logic and control circuitry is derived from a pair of bridge rectifiers that receive their AC inputs from the voltage across the triac when it is not conducting and from the secondary of a current monitor transformer when the triac is conducting.

6 Claims, 3 Drawing Sheets

LEVEL SENSOR AND CONTROL APPARATUS

BACKGROUND—FIELD OF INVENTION

This invention relates to the use of force responsive sensors and circuitry to detect the level of material within a storage bin, hopper, tank or the like and specifically to the control of an electric motor in response to the level of the material.

BACKGROUND—DESCRIPTION OF PRIOR ART

One of the management problems facing livestock and poultry producers today is that of the cost and reliability of manual labor. Delivering feed to livestock or poultry at the proper time and in the proper amount has been a major effort of farm labor. In the past this was done by carrying the feed to the animals in a bucket and dumping it into a feed trough. More recently this has been done by motor driven conveyors or augers. In the poultry industry, the feed is generally transferred from a large storage bin outside the poultry house to smaller transfer bins located within the house. Each of these inside transfer bins are then the source for the feed to the feeding troughs or rings that the poultry has access to. It is important to maintain a minimum level of feed in these transfer bins but just as important to never over flow these bins.

One approach at maintaining the feed within preset levels in the bins is the use of a manually operated switch that controls the motor to refill the bin. The obvious disadvantage of this method is the requirement for a person to do the switching as they observe the level within the bin.

A paddle-type switch that is physically moved by the feed as it rises in the bin has been tried in some poultry houses. A disadvantage of this switch is its high failure rate when subjected to the harsh environment of a poultry house. These mechanical switches are not reliable and tend to hang up either open or closed after a short time in the poultry house environment. Another disadvantage is that the paddle switch allows the electric motor to "short cycle". That is, when the feed level drops only slightly, the switch closes and turns the motor on to start refilling. After only a short time, enough feed has entered the bin to depress the switch and turn the motor off. This constant "short cycling" shortens the life of the electric motor and replacement of these expensive motors requires considerable manpower and thus is a costly operation.

An attempt at solving these problems is disclosed in U.S. Pat. No. 5,051,671, issued to Crider et al, on Sep. 24, 1991. This patent addressed the environmental problem by doing away with the mechanical switch and going to a sealed capacitance type sensor. The attempt to eliminate the short-cycle problem by adding a time delay from bin full to motor turn-on for refill, did not solve the problem but only increased the time the motor would run and the time it would be off and did not correlate these times to the actual rate of the drop in the feed level within the storage bin.

Another disadvantage of this prior-art teaching is the requirement for mechanical power relays to switch the AC power to the electric motor. These relays are expensive and notoriously unreliable and require a relatively large control current to achieve activation. Because these relays can be commanded to make or break at any random time during a cycle of AC power, they can create large electric arcs if commanded to open at or near a maximum of the AC current cycle or if commanded to make at or near the peak of the AC voltage cycle. These arcs cause premature failures of these relays that can hold the motor on when not desired and cause overfilling or hold the motor off when not desired and cause a bin to run dry.

Another disadvantage of this prior art teaching is the requirement for a special and therefore expensive transformer to provide the power necessary for the control circuitry.

Yet another disadvantage is the fact that the relay switch over from one primary of the transformer to the other is not instantaneous and can cause transients and drop outs within the apparatus that can cause failures.

A further disadvantage of this prior art disclosure is the limitation of not being capable of operating two of the units in series to control a single electric motor. It is sometimes desireable to sense the material level in two bins that are filled by the action of a common electric motor which should come on only when both bin sensors are in a refill required condition and turn off when ever either bin is full. This prior art disclosure does not allow for this mode of operation.

OBJECTS AND ADVANTAGES

It is the main object of this invention to provide an apparatus that senses the level of a material within a storage bin or hopper and to control the operation of an electric motor to maintain the material between a preset full level and a preset refill required level. It is an advantage to have preset full and refill levels so as to eliminate the motor short-cycles thus reducing motor wear, lowering power useage, and to allow the system to automatically and continuously adapt to the demand for the material, always maintaining sufficient material within the storage bin or hopper.

It is yet another object of this invention to provide an apparatus that may be operated with two units in series so that control of the electric motor will cause refilling when both bins refill sensors are in a refill required condition and cause the motor to turn off whenever either bin is full.

Another object of this invention is to provide an inexpensive, technically sound, reliable, lower power, and commercially attractive apparatus using state-of-the-art solid-state electronics. A disadvantage of the prior art disclosure is the requirement for a high-power, high current mechanical relay. These expensive relays are subject to arcing across the contacts especially with inductive loads such as motors that can cause failures and limits the usefull life of the unit.

An advantage of my invention is a completely solid-state design with the inherent reliability and long life provided by state-of-the-art solid-state electronics.

Another advantage of this invention is the use of Force-Sensing Resistors as level point sensors. These touch-responsive devices are the result of the recent discovery of polymeric piezoelectric films. The Force-Sensing Resistor is made up of two polymer films, one contains a conductive pattern of electrodes and the other contains a semiconductive polymer deposite. These two films are laminated together with a combination adhesive/spacer material with conductive leads brought to one edge. The entire Force-Sensitive Resistor is less than one inch square and less than 0.050 inches thick. The resistance of the sensor as measured at the conductive pads is greater than one megohn with no pressure on the surface of the device and less than 20 k with a force of only 0.45 psi applied to the surface of the device. The Force-Sensitive Resistor is inherently protected against force overloads, exhibits no corrosion, pitting, or electrical bouce, is immune from contaminant problems such as moisture and dust, has a minimum rated life of 10,000,000 cycles, and is insensitive to vibration and acoustic pickup.

As can be readily seen from the above discussion, these Force-Sensitive Resistors can easily and positively sense the presence or absence of a material such as feed, grains, sand, and even water.

These characters of the Force-Sensitive Resistor as used for point level sensors give the apparatus of this invention another advantage over all prior-art devices. These devices are P/N 304B and are manufactured by Interlink Electronics in Carpinteria, Calif.

Another advantage of this invention is the use of a solid-state triac switch to control the power to the motor and the use of a zero-crossing optical coupler to control the state of conduction of the triac. This zero-crossing optical coupler insures that the triac and thus the AC power to the motor is always switched to on only when the AC input voltage is at a minimum. This cannot be done with a mechanical relay as used in the prior-art disclosures. Since the triac will only turn off when the current through it goes to zero, the disadvantage of a mechanical relay are adverted and we also have the added advantages of lower power necessary to drive the triac than the power relay and at a lower cost.

DRAWING FIGURES

DESCRIPTION

Figure 1:
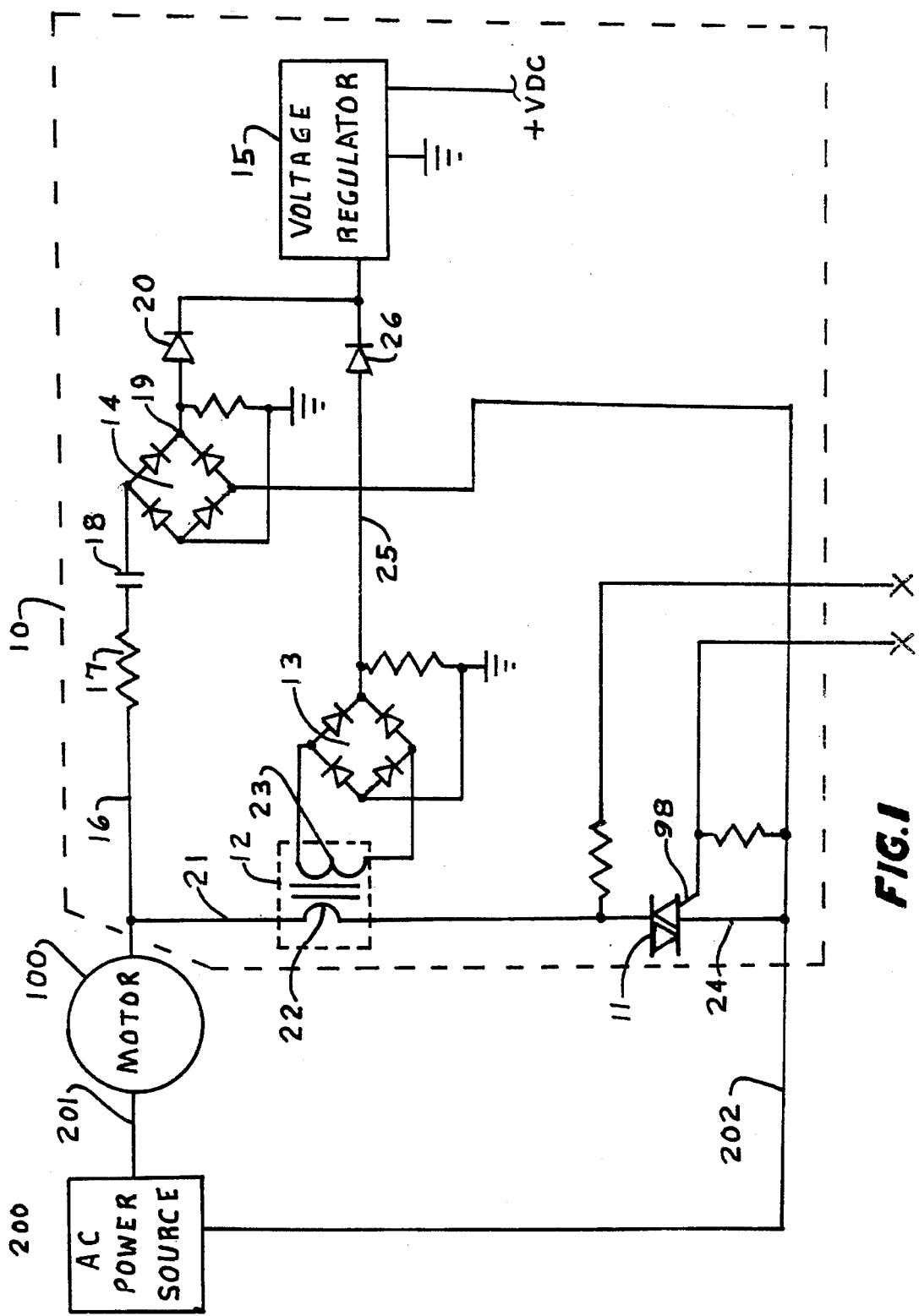
FIG. 1 is a schematic of the triac switch and the power supply circuit illustrating how this part of the invention is configured and how the apparatus interfaces with the AC power source and the motor.

A typical embodiment of the electronics of the present invention that interface with the AC power source and the motor to generate the DC voltage for operating the control and logic circuits is illustrated in FIG. 1.

Referring to the drawing, it may be seen that the power supply circuit 10 consists primarily of a triac switch 11, a current sensing transformer 12, two bridge rectifiers 13 & 14, and a voltage regulator 15. With the motor 100 not running and the triac switch 11 not conducting, the AC Power Source 200 is routed through wire 201 to motor 100, through wire 16 to resistor 17 and capacitor 19 in series, to the bridge rectifier 14, and then through wire 202 back to the AC Power Source 200. Resistor 16 and capacitor 17 are in the circuit to limit the AC Power Source 200 voltage, typically 230 VAC or 115 VAC, into the bridge rectifier 14. Bridge rectifier 14 produces a positive DC voltage at junction 19 which passes through blocking diode 20 to the input of the voltage regulator 15. The output of the voltage regulator 15 is a positive DC voltage for powering the logic and control circuits 50 when the motor 100 is not running.

With the motor 100 running and the triac switch 11 closed or on, the AC Power Source 200 is routed through wire 201 to motor 100, through wire 21 to the primary 22 of current monitor transformer 12, to the triac switch 11, through wire 24 to wire 202 and back to the AC Power Source 200.

Transformer 12 is a current monitor or sensing type. Current monitor transformers are single secondary winding devices that surround the conductor under test and use it as a primary to give a voltage output proportional to the current being monitored. The primary 22 of the current monitor transformer 12 consists of very few turns of a 16 AWG or larger wire. The large currents required to run the motor 100 pass through these few primary 22 turns and generate a voltage across the secondary 23 of the transformer 12. The voltage across the secondary 23 is rectified by bridge 13 which gives a positive DC voltage on wire 25 which passes through blocking diode 26 to the input of the voltage regulator 15. The output of the voltage regulator 15 is the same positive DC voltage as was derived above for the motor not running but now is produced when the motor 100 is running.

Since the logic and control circuits 50 require less than 10 ma of current, the components of the power circuits 10 are all small, inexpensive, low voltage, low power electronics.

Figure 2:
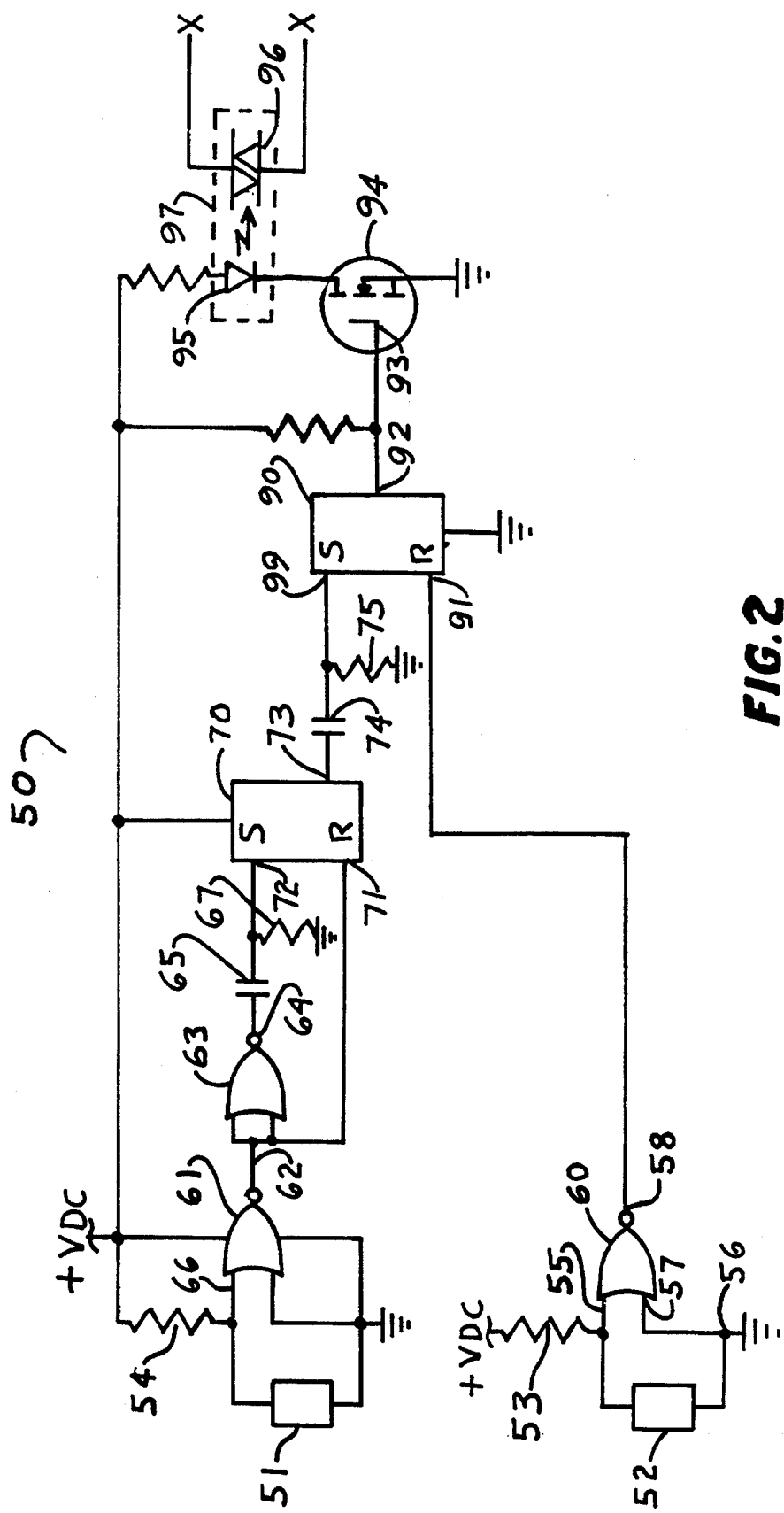
FIG. 2 is a schematic of the logic and control circuit illustrating how this part of the invention is configured and how the apparatus interfaces with the Force-Sensitive Resistor sensors.
Figure 3:
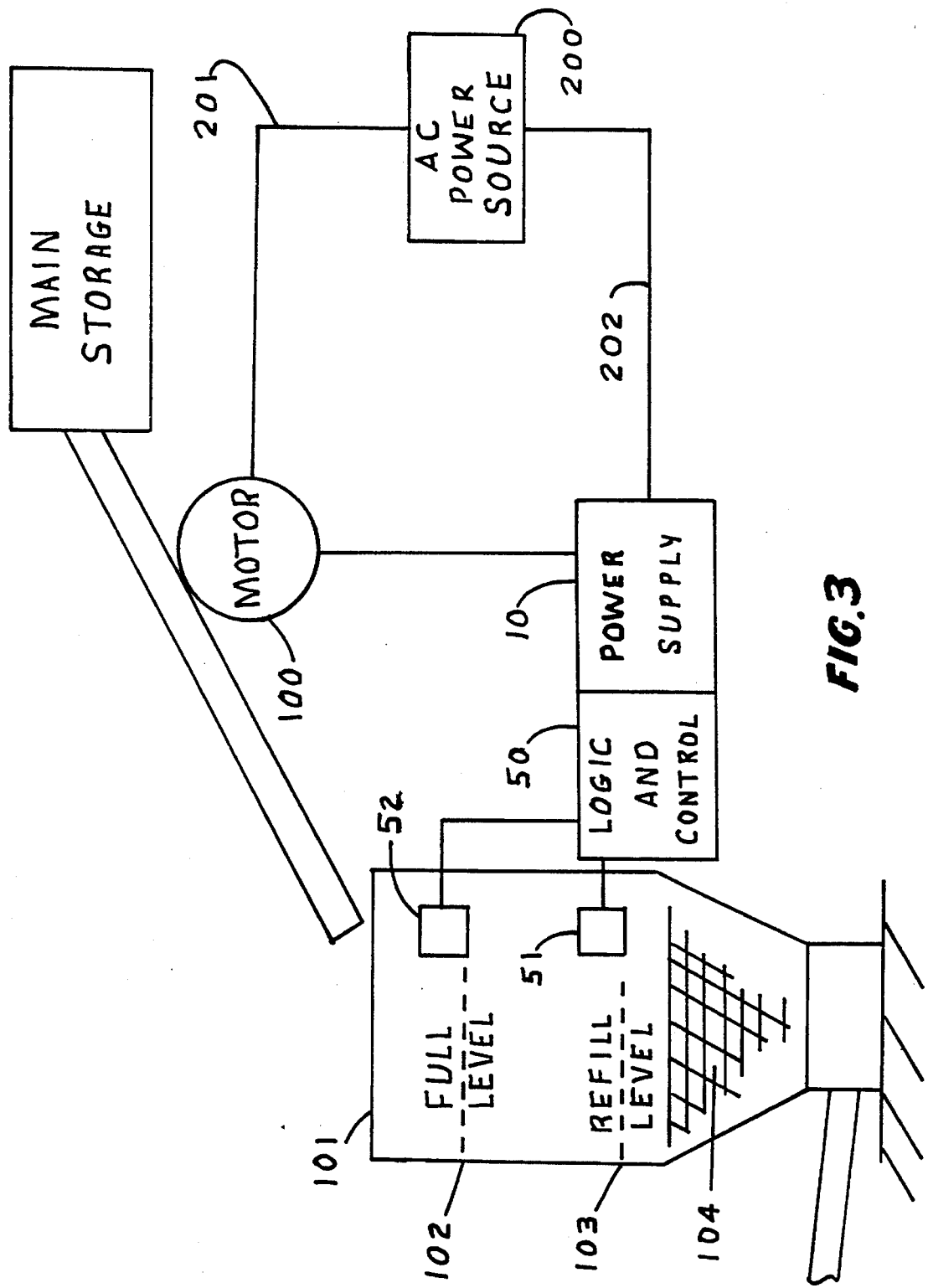
FIG. 3 is a block diagram of the invention and how it is connected into a feed bin storage system.

A typical embodiment of the electronics of the present invention that forms the logic and control circuits and thus the operational control of the motor is illustrated in FIG. 2.

Bin full sensor 52 is a Force-Sensitive Resistor that is placed in the bin at the point chosen as the full point 102. When no force is applied to the sensor 52, that is, the feed is not touching the sensor 52, the resistance is greater than one megohm. Resistor 52 is a 100 k value and is in series with the one megohm resistance of sensor 52 to a common ground 56. Under the conditions with no force on sensor 52, the voltage at one input 55 of a logic NOR 60 is at a positive high or a logic "1" while the other input 57 is held at common ground 56 or a logic "0". The output 58 of logic NOR 60 is therefore a logic '0'.

When the material 104 in the Bin 101 rises to the preselected full position 102, it applies a force on sensor 52 causing the resistance of sensor 52 to drop to less than 20K. Resistor 53 is now in series with a sensor 52 resistance of less than 20K which lowers the voltage at input 55 of logic NOR 60 to a logic "0". With a logic "0" on each input 55 and 57, the output 58 of logic NOR 60 goes to a logic "1" or to the voltage of the positive supply.

The output 58 of logic NOR 60 is applied as an input to the reset input 91 of a Type D Flip-Flip 90. With a logic "1" to the reset 91, the output 92 of the Flip-Flop 90 will be a logic "0". The output 92 of the Flip-Flop 90 is tied directly to the gate 93 of an N-channel enhancement mode MOSFET 94. With a logic "0" or near common ground 56 on the gate 93, MOSFET 94 will be in an off or non-conducting state. With MOSFET 94 non-conducting there is not current through the light-emitting diode 95 of optical coupler 97 and thus the output 96 of optical coupler 97 is off. The output 96 of the optical coupler 97 is the drive power for the gate 98 of triac 11. With no gate 98 drive power, triac 11 is off and therefore Motor 100 is not running.

When the material 104 in the Bin 101 drops away from sensor 52, the resistance of the sensor 52 returns to its high resistance state of over one megohm. This rise in resistance causes a change of state of logic NOR 60 output 58 which returns to a logic "0" or a low voltage and removes the reset 91 from the Flip-Flop 90. However, Flip-Flop 90 will not change its output 92 state until it receives a set command or a logic "1" at input 99. This will not occur until the material 104 drops below the present refill line 103 and removes the force on sensor 51.

Whenever the material 104 is above the refill line 103 in Bin 101, sensor 51 has the force of the material 104 on it and thus is in it's low resistance condition which is less than 20K that is in series with a 100K resistor 54 to the common ground 56. Under these conditions Logic NOR 61 has both inputs at logic "0" or a low voltage and the output 62 will be a logic "1" or a high. Logic NOR 61 output 62 is tied directly to the reset 71 of another Type D Flip-Flop 70. With a logic "1" on the reset 71, the output 73 of the Flip-Flop 70 will be held at a logic "0".

When the material 104 drops below the refill line 103 in Bin 101, the force on sensor 51 is removed and the resistance of sensor 51 rises, the voltage at the input 66 to logic NOR 61 changes from a logic "0" to a logic "1" and causes the output 62 of logic NOR 61 and the reset input 71 of Flip-Flop 709 to change from a logic "1" to a logic "0". Logic NOR 63 is wired as a logic inverter and has its input as the output 62 of logic NOR 61. Therefore when the material 104 in Bin 101 drops below the refill line 103, the output 64 of inverter 63 changes from a logic "0" to a logic "1". This positive going voltage is coupled through capacitor 65 to the set input 72 of Flip-Flop 70. Capacitor 65 together with resistor 67 differentiate the output 64 of inverter 63 so the set input 72 of Flip-Flop 70 is a positive voltage spike or pulse that returns the set input 72 to near zero volts is less than a millisecond. However, once Flip-Flop 70 receives a set input 72 command, the output 73 goes high or to a logic "1" and remains in this state until a reset 71 command is received by Flip-Flop 70.

The positive going output 73 of Flip-Flop 70 is coupled through capacitor 74 to the set input 99 of Flip-Flop 90. Capacitor 74 together with resistor 75 differentiate the output 73 of Flip-Flop 70 so the set input 99 of Flip-Flop 90 is a positive voltage spike or pulse that returns the voltage at set input 99 to zero volts is less than 1 millisecond. However, once the Flip-Flop 90 receives a set input 99 command, the output 92 goes high or to a logic "1" and remains in this state until a reset 91 command is received.

When the output 92 of Flip-Flop 90 goes to a logic "1" or to a high voltage state, the gate 93 of MOSFET 94 goes high and MOSFET 94 will conduct. With MOSFET 94 conducting, current flows through the diode 95 of the optical coupler 97 and turns on the output section 96 of the optical coupler 97 which in turn applies power to the gate 98 of triac 11 and allows AC current to flow through the triac 11 and turns on the motor 100. Since the optical coupler 97 is a zero crossing type, the output 96 will actually turn on at the next zero crossing of the AC voltage applied and not at the instant the command is received.

When motor 100 comes on it will refill Bin 101 with material 104. When triac 11 turns on and motor 100 starts to run, the voltage across the triac 11 drops from the voltage of the AC Power Source 200, typically 240 VAC, to less than 2 VAC which is not sufficient to supply the necessary DC voltage to operate the Voltage Regulator 15. However, at the same time as the voltage across the triac 11 is decreasing, the voltage across the secondary 23 of current monitor transformer 12 is increasing due to the increasing current through triac 11 and motor 100 and therefore provides continuous DC voltage to the Voltage Regulator 15 through diode 26. When the level of the material 104 increases above the refill line 103 and thus covers sensor 51 once again, the resistance of sensor 51 decreases to less than 20K. This in turn causes the output 62 of logic NOR 61 to go from a logic "0" to a logic "1", the output 64 of inverter 63 to go from a logic "1" to a logic "0", the reset input 71 of Flip-Flop 70 to go to a logic "1" and the output 73 of Flip-Flop 70 to go to a logic "0". The output 92 of Flip-Flop 90 and thus the state of MOSFET 94 does not change and the motor 100 continues to run.

When the material 104 in Bin 101 reaches the full line 102 and sensor 52, it will apply force to the sensor 52 and cause its resistance to drop to less than 20K which sets into motion the events as previously described which results in the motor 100 being turned off.

The invention I have described herein operates without the requirement of an outside source of electricity as the logic and control components 50 receive power from a uniquely configured power supply 10 which allows this apparatus to easily replace an existing motor control switch system and provide the advantages of an accurate, reliable, solid-state, and yet inexpensive unit.

From the foregoing it may readily be seen that I have invented a reliable, efficient and yet inexpensive means to control and maintain the level of a material within a bin, hopper, or the like. The apparatus described herein will work equally well with materials such as feeds, grains and sand as well as with liquids.

SUMMARY RAMIFICATIONS AND SCOPE

Although the description above contains many specifications, these should not be construed as limiting the scope of the invention but merely illustrating the presently preferred embodiment of this invention. For example, the logic NOR's used in the preferred embodiment have been implemented as an MC14001 integrated circuit. This could take on other forms such as an LM339 comparator. The Type D Flip-Flop used in the preferred embodiment was implemented as a dual integrated circuit MC14013. This could be implemented in other forms including a combination of discrete bipolar transistors. The MOSFET used as a switch could easily be implemented as a bipolar transistor. It is understood that this invention may be modified in many ways within the scope of the appended claims. In particular, it is to be understood that this invention is not limited to the specific embodiment, wire configuration, electronic circuitry, logic configuration, number of sensors, or to the numerical values employed in describing the invention. Furthermore, many other types of components may be employed in practicing the invention in place of those which have been specifically described.

LEVEL SENSOR AND CONTROL APPARATUS

This list is only for convenience in referring to the drawings. It is not intended to be a part of the patent application.

REFERENCE NUMERALS USED IN THE DRAWINGS

10 Power Supply Circuit
11 Triac
12 Current Monitor Transformer
13 Bridge Rectifier
14 Bridge Rectifier
15 Voltage Regulator
16 Connecting wire
17 Resistor
18 Capacitor
19 Bridge Rectifier Positive Output
20 Diode
21 Connecting wire
22 Primary of transformer 23 Secondary of transformer
24 Connecting wire
25 Connecting wire (Bridge Rectifier Positive Output)
26 Diode
50 Logic and Control Circuit
51 Refill Sensor
52 Full Sensor
53 Resistor
54 Resistor
55 NOR Input (60)
56 Common Ground for Logic and Control Circuitry
57 NOR Input (60)
58 NOR Output (60)
60 Logic NOR
61 Logic NOR
62 NOR Output (61)
63 Logic NOR
64 NOR Output (63)
65 Capacitor
66 Resistor
70 Type D Flip-Flop
71 Reset Input (70)
72 Set Input (70)
73 Flip-Flop Output (70)
74 Capacitor
75 Resistor
90 Type D Flip-Flop
91 Reset Input (90)
92 Flip-Flop Output (90)
93 MOSFET Gate (94)
94 MOSFET
95 Optical Coupler LED (97)
96 Optical Coupler Output (97)
97 Optical Coupler
98 Triac Gate
99 Set Input (90)
100 Motor
101 Bin or Hopper
102 Full Level (101)
103 Refill Level (101)
104 material in Bin (101)
200 AC Power Source
201 Connecting Wire
202 Connecting Wire

I claim:

1. A device for detecting a level of a material in a bin or hopper and turning on or off a motor to control feeding of said material into said bin or hopper which in turn controls said level of said material within a preselected full point and a preselected refill point, said device comprising:

(a) a first electronic force sensitive resistor located at said full point for detecting a force of said material, a first electronic circuit means responsive to the detected force for turning off said motor thereby stopping said material from overflowing of the bin, said circuit means comprising:

a first logic nor gate connected to said first force sensitive resistor located at said full point of said bin so that when the resistance of first resistor is low a output of said first nor gate is high;

a first type D flip flop with a reset input of said flip flop connected to the output of said first nor gate so that when said output of said first nor gate is at a logic high an output of said first flip flop is reset to a logic low;

an enhancement mode, N-channel MOSFET switch with a gate of said MOSFET switch connected to the output of said first flip flop so that when said first flip flop is reset said MOSFET switch is in a non-conducting mode;

an optical coupler with an input LED in electrical series with said MOSFET switch such that when said MOSFET switch is in the non-conducting mode said optical coupler is also in a non-conducting mode and an output section of said optical coupler is in the non-conducting mode;

a triac switch with a gate connected to the output of said optical coupler so that when said output of said optical coupler is in the non-conducting mode said triac switch is also in the non-conducting mode;

said triac switch is connected in electrical series with said motor so that when said triac switch is in the non-conducting mode said motor is off and said material is stopped from overfilling said bin; and (b) a second electronic force sensitive resistor located at said refill point within said bin for detecting a force of said material, a second electronic circuit means responsive to a detected force for turning on said motor thereby refilling said bin with said material, said circuit means having:

a second logic nor gate connected to said second force sensitive resistor located at said refill point of said bin so that when the resistance of said second resistor is high a output of said second nor gate is low;

a third logic nor gate connected so that when an input of said third nor gate is a logic low, an output of said third nor gate is a logic high;

a second type D flip flop with a set input of said second flip flop connected to the output of said third nor gate so that when said output of said third nor gate goes to a logic high an output of said second flip flop is set to a logic high;

said first flip flop with a set input of said first flip flop connected to the output of said second flip flop so that when said output of said second flip flop goes to a logic high the output of said first flip flop is set to a logic high;

said MOSFET switch with the gate of said MOSFET switch connected to the output of said first flip flop so that when the output of said first flip is set said MOSFET switch is in a conducting mode;

said optical coupler with the input LED of said optical coupler in electrical series with said MOSFET switch such that when said MOSFET switch is in a conducting mode said LED is also in a conducting mode and the output section of said optical coupler is in the conducting mode;

said triac switch with the gate connected to the output of said optical coupler so that when said output of said optical coupler is in the conducting mode said triac switch is also in the conducting mode;

said triac switch connected in electrical series with said motor so that when said triac switch is in the conducting mode said motor is on and said material is allowed to fill said bin.

2. The device as claimed in claim 1, further comprising:

(a) a resistor a capacitor and a bridge rectifier connected in electrical series with said motor to be controlled and an alternating current power source wherein the series combination of said resistor said capacitor and said bridge has a high impedance relative to an impedance of said motor such that electric current through said motor is insufficient for said motor to run;

said bridge rectifier has an output that is a direct current voltage;

a first diode has an anode terminal connected to a positive output terminal of said bridge rectifier;

a voltage regulator with an input connected to a cathode terminal of said first diode to provide a regulated DC voltage output whenever said motor is not running, and, a transformer with a primary winding that is connected in electrical series with said triac switch;

a secondary winding of said transformer connected to a second bridge rectifier so that when said motor is running an AC voltage is generated in said secondary of said transformer;

said second bridge rectifier is connected to said secondary of said transformer to produce an output that is a direct current voltage;

a second diode that has an anode terminal connected to a positive output terminal of said second bridge rectifier;

said voltage regulator with the input connected to the cathode terminal of said second diode to give a regulated DC voltage output whenever said motor is running.

3. The device as defined in claim 1 wherein said optical coupler will turn on said triac switch only at the zero crossings of said alternating current power source.

4. The device as defined in claim 1 wherein said electronic force sensitive resistor located at said full point within said bin is electrically connected in parallel with multiple electronic force sensitive resistors located in one or more other bins at the respective full points to detect said full point in any of said bins thereby turning off said motor and stopping said material from overflowing said bins.

5. The device as defined in claim 1 wherein said electronic force sensitive resistor located at said refill point within said bin is electrically connected in parallel with multiple electronic force sensitive resistors located in one or more other bins at the respective refill points to detect said refill point in any of said bins thereby turning on said motor and refilling said bins with said material.

6. The device as described in claim 2 wherein said device is used as a DC power source to provide DC power to logic level components of the device.

\* \* \* \* \*